J. H. YOCUM, Jr.
Joints for Water Pipes.

No. 153,511.  Patented July 28, 1874.

Figure 1:
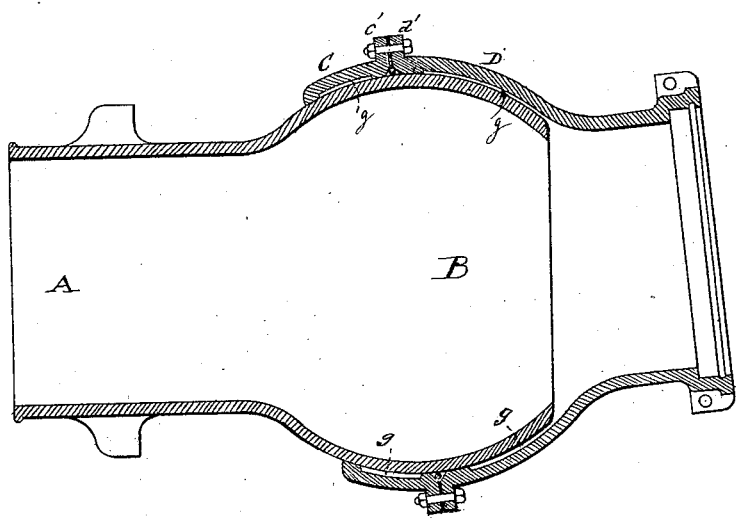
Figure 2:
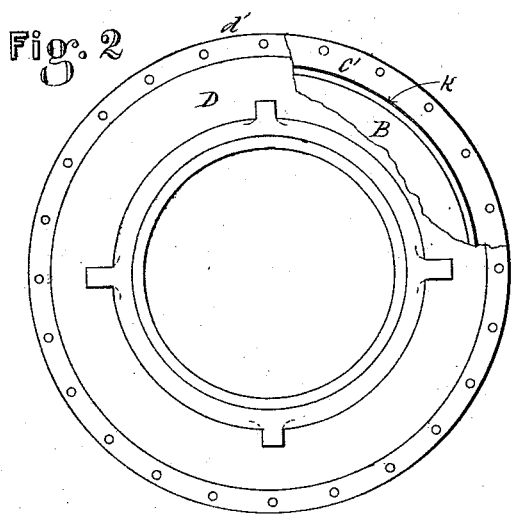

Scale for Figs. 1 & 2.

Figure 3:
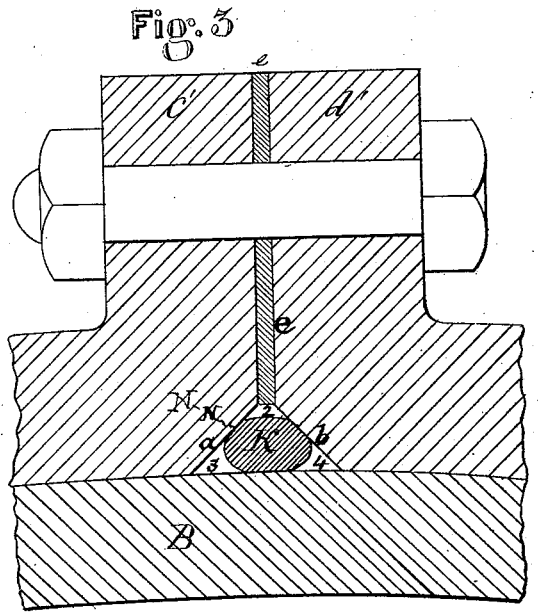

Scale for Fig. 3.

Witnesses: Edw. Brown, John F. Grant

Jacob H. Yocum Jr.

THE GRAPHIC CO. PHOTO-LITH. 39 & 41 PARK PLACE, N.Y.

UNITED STATES PATENT OFFICE

JACOB H. YOCUM, JR., OF CAMDEN, NEW JERSEY.

IMPROVEMENT IN JOINTS FOR WATER-PIPES.

Specification forming part of Letters Patent No. 153,511, dated July 28, 1874; application filed May 8, 1872.

*To all whom it may concern:*

Be it known that I, JACOB H. YOCUM, Jr., of Camden, New Jersey, have invented certain Improvements in Joints for Water-Pipes, of which the following is a specification:

My invention relates to the construction of the ball-and-socket joint of water-pipes, so that the joint is capable of motion, and will remain water-tight with less amount of fitting than is usually given to make a water-tight joint.

I take the usual ball-and-socket joint, consisting of a ball and two concave sockets, one of which is slipped over the small end of the pipe, and bolted to the other by means of flanges. At the junction of the flanges with each other and with the ball, I cut away a groove in the flanges, in which I insert an elastic cord. The section of the groove is of such a shape as to compress the cord upon the ball, and at the same time admit of the alteration in the sectional form of the cord consequent upon the metal surfaces of the ball and socket coming in close contact, the object and advantage of which is to obtain an annular chamber (within the sockets) of arched or conical cross-section with opposite inclined side-bearing points $a$ $b$, upon the packing-cord K and intervening spaces 2 3 4, to give a free adjustment to the cord, an oblated packing contact of the latter with the ball, and to isolate and seal the separate flange-packing $e$ from the ball, the said intervening spaces giving ample room and freedom for the cord to move and adjust itself at three points of bearing, and to allow the sockets and ball to have and maintain a constant metallic bearing and contact on both sides of the packing-cord — an advantage which it is practically impossible to obtain by tightly-clamped packing, projecting from a tightly-fitting grasping seat or hold against the surface to be packed.

Referring to the drawings, making part of this specification, Figure 1 is a longitudinal section. Fig. 2 is an end view, with a small portion broken away. Fig. 3 is an enlarged section of the packing-ring.

A is the water-pipe, enlarged into the ball B, which is turned on the outside to a spherical form. This ball is inclosed by a spherical socket made in two parts, C and D, which are bored out and bolted together by the flanges $c'$ $d'$, as is usual with the ball-and-socket joint. The faces of the flanges $c'$ and $d'$ are cut away at an angle, so as to form a conical packing-box, N, within which I place an india-rubber ring, K, three-fourths of an inch in diameter, and made a little smaller than the ball B, so as to tighten upon it independently of the pressure put upon the ring by the bolting together of the flanges $c'$ and $d'$. $e$ is a packing-strip of some material, such as pasteboard, so that the flanges can be closed sufficiently to give the proper friction upon the ball.

The recess $g$, between the chipping-strips, can be filled with lead, if desired.

The difficulty of obtaining a ball-and-socket water-tight joint of this large size here shown is well known, even when great care is bestowed on turning and grinding the surfaces. By my invention the joint is made water-tight with far less expense in construction.

This joint is particularly adapted to water-pipes which are laid on the bed of a river. The pipes are jointed above the water, and then sunk to the bottom, where they accommodate themselves to the inequalities of the bottom and remain tight.

I make no claim to inserting a packing between the flanges $c'$ and $d'$ in contact with the ball B, as that is old. My invention is in the forming of the groove N, and so proportioning it to the sectional area of the india-rubber cord K, or a cord of similar elastic material, that the bringing of the sockets C and D in close contact with the ball B shall at the same time put the requisite pressure upon the india-rubber cord K to bring it in water-tight contact with the flanges $c'$ $d'$ and the ball B, and permit the free alteration of its sectional form consequent upon the pressure put upon it.

I claim—

The combination of the ball and sockets B C D with the chamber N 2 3 4, formed as described, and the rubber cord K, as described.

JACOB H. YOCUM, JR.

Witnesses:
 EDWD. BROWN,
 JOHN F. GRANT.